US00RE33862E

United States Patent [19]

Mori et al.

[11] E Patent Number: Re. 33,862

[45] Reissued Date of Patent: Mar. 31, 1992

[54] [METHOD AND APPARATUS FOR TRANSPORTATION OF MATERIALS] *DISTRIBUTION METHOD AND FLEXIBLE MANUFACTURING APPARATUS*

[75] Inventors: Kinji Mori, Yokohama; Yasuo Suzuki, Ebina; Masayuki Orimo, Machida; Shoji Miyamoto, Kawasaki; Hirokazu Ihara, Machida, all of Japan

[73] Assignee: Hitachi, Ltd., Tokyo, Japan

[21] Appl. No.: 454,860

[22] Filed: Jan. 16, 1990

Related U.S. Patent Documents

Reissue of:

[64] Patent No.: 4,564,102
Issued: Jan. 14, 1986
Appl. No.: 547,133
Filed: Oct. 31, 1983

U.S. Applications:

[63] Continuation of Ser. No. 143,960, Dec. 22, 1989, abandoned.

[30] Foreign Application Priority Data

Oct. 29, 1982 [JP] Japan ..... 57-189060

[51] Int. Cl.[5] ..... B65G 43/00

[52] U.S. Cl. ..... 198/341; 198/349.7; 29/563; 364/474.11

[58] Field of Search ..... 198/341, 356, 358, 465.2, 198/340, 349.7, 349.9, 346.1; 29/563, 564, 33 P; 364/474, 478, 825.23, 900

[56] References Cited

U.S. PATENT DOCUMENTS

| | | | |
|---|---|---|---|
| 3,576,540 | 4/1971 | Fair et al. | 198/341 X |
| 3,726,383 | 4/1973 | Bornfleth et al. | 198/358 |
| 3,743,090 | 7/1973 | Brown et al. | 198/349.9 X |
| 3,753,237 | 8/1973 | Koontz et al. | 364/900 |
| 3,803,556 | 4/1974 | Duffy | 198/349 X |
| 3,854,889 | 12/1974 | Lemelson | 29/563 X |
| 3,952,388 | 4/1976 | Hasegawa et al. | 198/349 X |
| 4,397,384 | 8/1983 | Nohren, Jr. | 198/341 |
| 4,472,783 | 9/1984 | Johnstone et al. | 364/478 X |

FOREIGN PATENT DOCUMENTS

| | | | |
|---|---|---|---|
| 2230633 | 1/1973 | Fed. Rep. of Germany | 198/349 |
| 2442659 | 3/1976 | Fed. Rep. of Germany | 414/134 |
| 56-152558 | 11/1981 | Japan | 29/563 |
| 2109278 | 6/1983 | United Kingdom | 29/33 P |

*Primary Examiner*—Robert P. Olszewski
*Assistant Examiner*—James R. Bidwell
*Attorney, Agent, or Firm*—Antonelli, Terry Stout & Kraus

[57] ABSTRACT

A plurality of machine tools are disposed along a circulating conveyor transporting materials to be processed by the machine tools, and material selector subsystems associated with the respective machine tools are provided together with a load/unload command subsystem. The material selector subsystems exchange information therebetween to track materials loaded on the conveyor under command of the load/unload command subsystem so as to reserve materials requested by the individual machine tools. Each of the reserved materials is unloaded from the conveyor under command of the load/unload command subsystem as soon as it arrives at the position of the corresponding machine tool.

23 Claims, 9 Drawing Sheets

[METHOD AND APPARATUS FOR TRANSPORTATION OF MATERIALS] *DISTRIBUTION METHOD AND FLEXIBLE MANUFACTURING APPARATUS*

Matter enclosed in heavy brackets [ ] appears in the original patent but forms no part of this reissue specification; matter printed in italics indicates the additions made by reissue.

*This application is a continuation of U.S. application Ser. No. 143,960, filed Dec. 22, 1989, now abandoned, which is a reissue of U.S. application Ser. No. 547,133, now U.S. Pat. No. 4,564,102.*

BACKGROUND OF THE INVENTION

1. Field of the Invention

This invention relates to a method and apparatus for transportation of materials, in which materials to be machined by individual machine tools are continuously circulated on a conveyor, and a specific one selected from among them is unloaded from the conveyor to be supplied to a specific machine tool when the specific material is requested by the specific machine tool.

2. Description of the Prior Art

Hitherto, materials to be machined by individual machine tools according to the production schedule have been previously distributed to corresponding ones of the machine tools, or such materials have been stored in a warehouse so that a specific one selected from them can be supplied by a conveyor from the warehouse to a specific machine tool upon request for machining by the machine tool. However, the former method is not applicable to a production system in which the production schedule is frequently changed resulting in a corresponding change of the machine tools participating in material processing or the production schedule cannot be sufficiently laid out in advance. According to the latter method, on the other hand, pallets on which the materials are carried, respectively, are marked by a central unit according to the production schedule with the addresses of specific machine tools which are scheduled to process the materials and the pallets are transported by the conveyor. Thus, in the case of the latter method, the relationship between the machine tools and the materials to be processed thereby must be preliminarily determined. Further, an addressing error of the central unit results in maloperation of the whole system. Further, it has been required for the central unit to collect and process a vast amount of information, since the central unit must always exactly grasp the operating state and occurrence of operational failure, if any, of the individual machine tools. Furthermore, the latter method, in which a material is not transported to a machine tool by the conveyor until the machine tool requests distribution of such a material, has been defective in that a considerably long period of time is required until the material is actually supplied to the machine tool after the request is issued.

SUMMARY OF THE INVENTION

It is a primary object of the present invention to provide a method and apparatus for transportation of materials, which can easily deal with a change of the production schedule, operational failure of a machine tool and maintenance required for the machine tools, and in which any error of material selection does not result in mal-operation of the whole system.

The present invention which attains the above object is featured by the fact that materials required for production are placed on a circulating conveyor to be continuously circulated past a plurality of machine tools so that materials requested by the individual machine tools can be readily selected from among those circulated to the positions of the machine tools, and material selector subsystems belonging or connected to the machine tools respectively exchange information therebetween to track the materials being circulated so that a requested material can be readily reserved and then unloaded from the conveyor upon arrival at the position of the machine tool scheduled for machining it.

DESCRIPTION OF THE PREFERRED EMBODIMENTS

Figure 1:
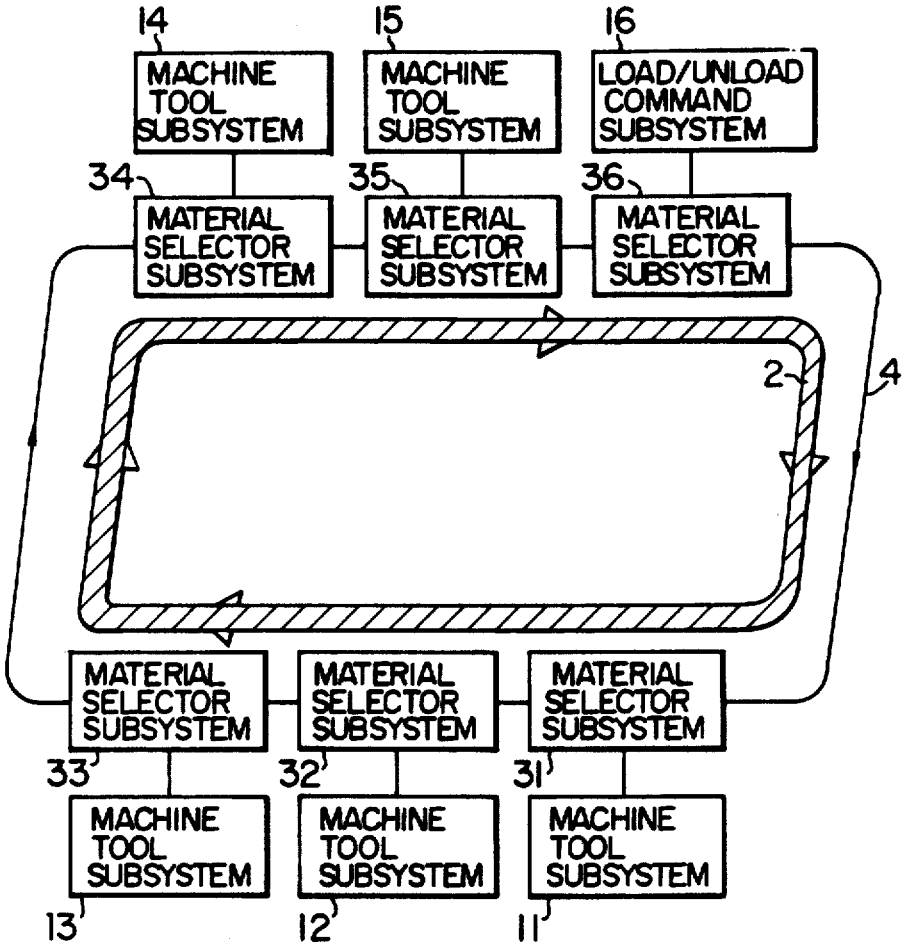
FIG. 1 is a block diagram showing the general structure of a preferred embodiment of the system according to the present invention.

FIG. 1 shows the general structure of a preferred embodiment of the system according to the present invention.

Referring to FIG. 1, a material transporting conveyor 2 is circulated continuously in a direction shown by an arrow past a plurality of distributed machine tool subsystems 11 to 15 and a load/unload command subsystem 16. Material selector subsystems 31 to 35 and 36 are connected to the machine tool subsystems 11 to 15 and the load/unload command subsystem 16 respectively so as to load and unload in a well-known manner selected materials on and from the conveyor 2. These material selector subsystems 31 to 36 are interconnected by an information transmission loop 4 for exchange of information of materials on the conveyor 2 and information of their positions on the conveyor 2.

Figure 2:
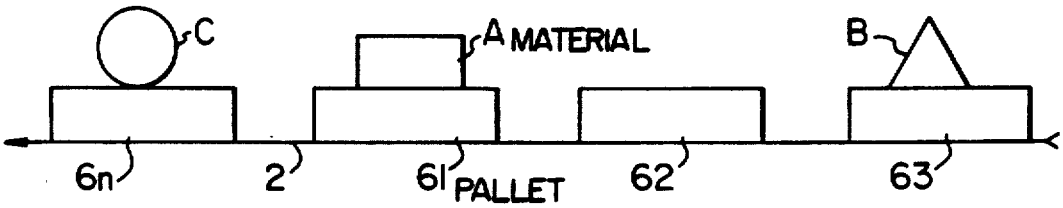
FIG. 2 is a diagrammatic elevation view showing the arrangement of pallets and materials on the conveyor shown in FIG. 1.

FIG. 2 shows, for example, that each of materials A, B, C, and so on is carried on one of the pallets 61 to 6n which are loaded on the conveyor 2 and no materials is carried on a pallet 62.

The load/unload command subsystem 16 applies a command to the material selector subsystem 36 for loading newly externally supplied materials from the warehouse on the conveyor 2 or unloading materials from the conveyor 2 for storing the materials to the warehouse.

Figure 3:
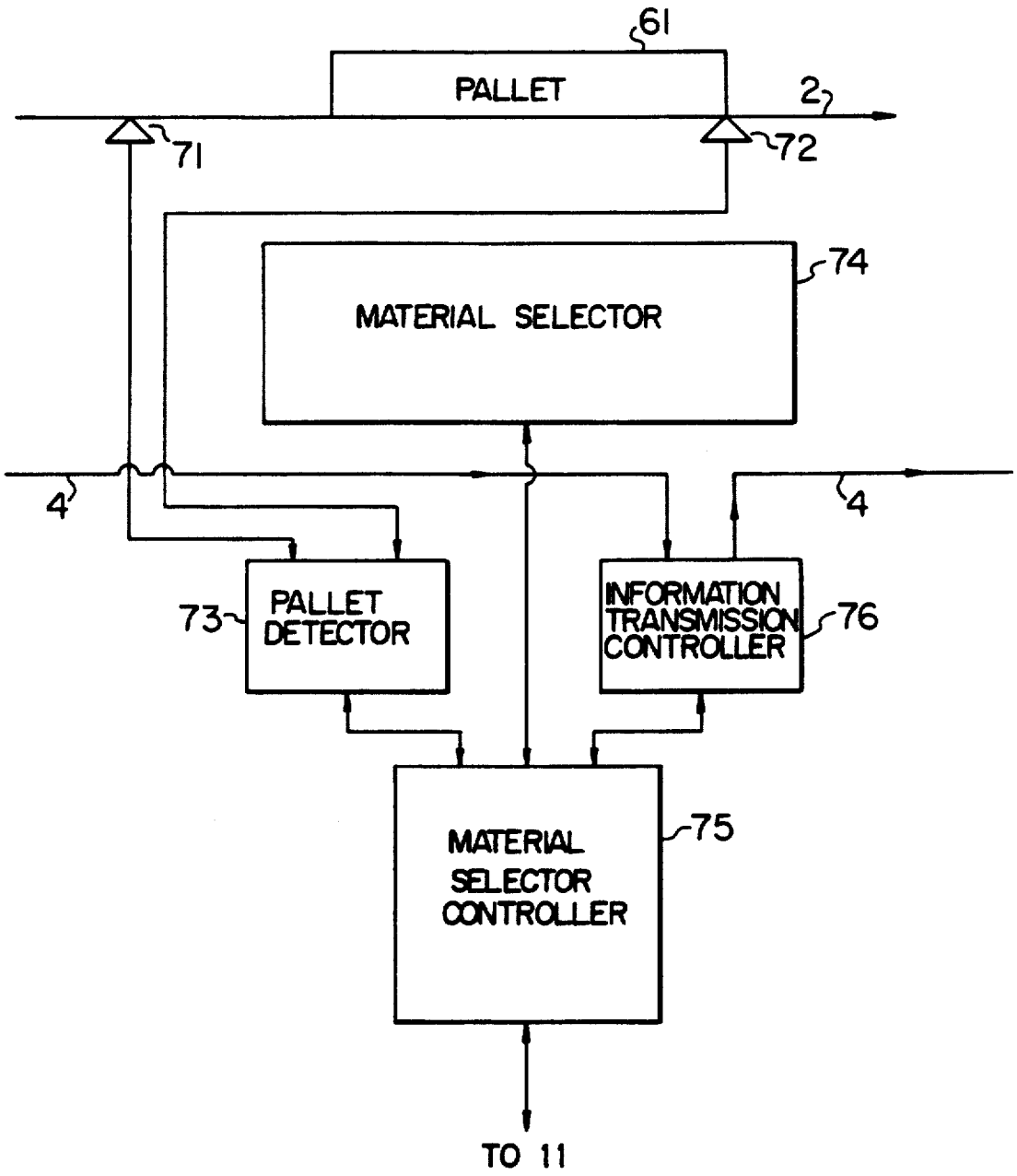
FIG. 3 is a block diagram showing the structure of one form of one of the material selector subsystems shown in FIG. 1.

FIG. 3 shows the internal structure of one form of the material selector subsystem 31. The subsystems 32 to 35 are arranged in the same manner as the subsystem 31.

Referring to FIG. 3, the material selector subsystem 31 includes a pair of material detectors 71 and 72 for detecting a pallet on the conveyor 2, a pallet detector 73 receiving the output signals from the detectors 71 and 72, a material selector 74 for selectively loading or unloading materials to or from the conveyor 2, a material selector controller 75 for controlling the material selector 74, and an information transmission controller 76 for controlling exchange of information between the material selector subsystem 31 and the other material selector subsystems.

Figure 4:
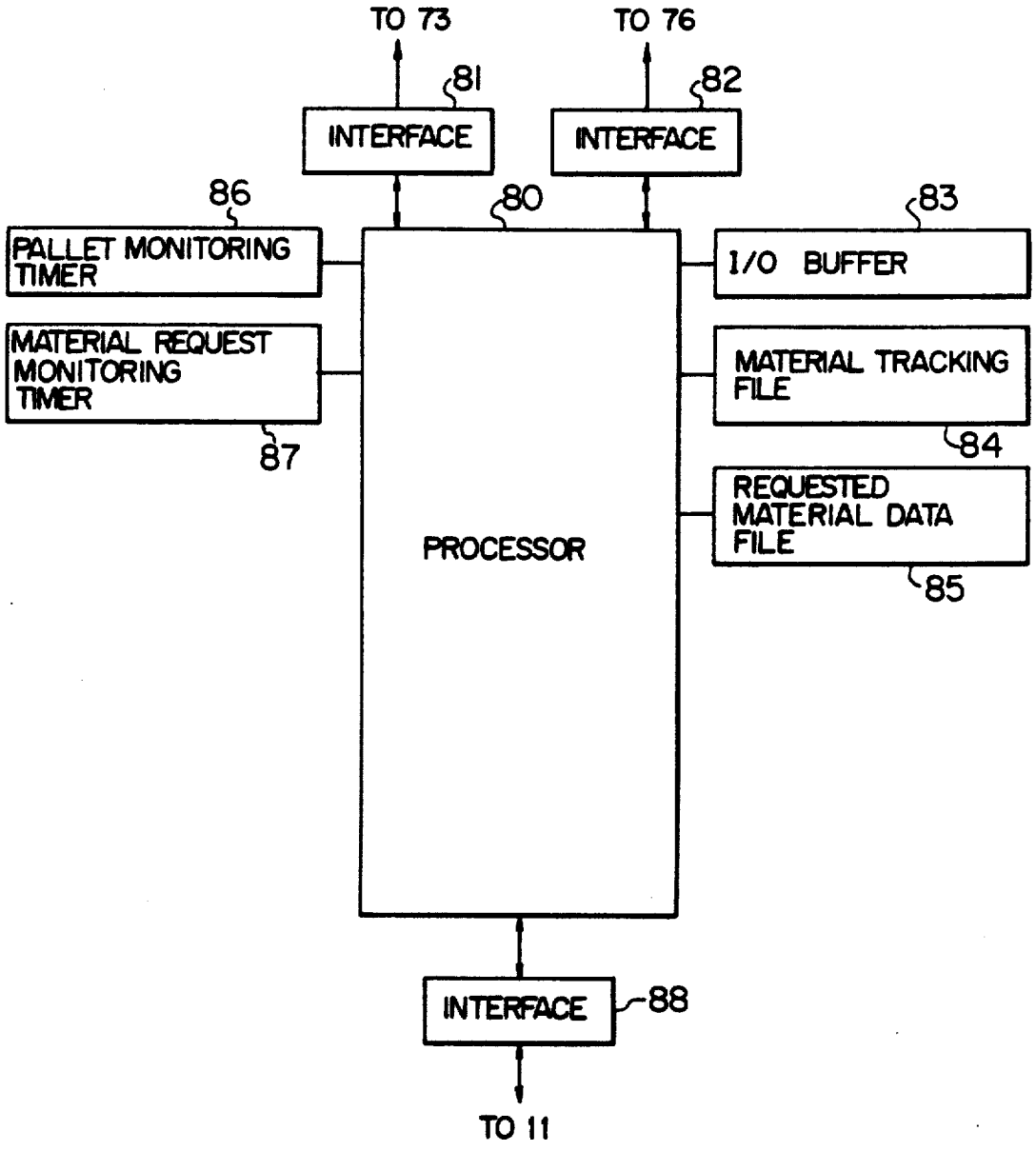
FIG. 4 is a block diagram showing the structure of one form of the material selector controller shown in FIG. 3.

FIG. 4 shows the internal structure of one form of the material selector controller 75 shown in FIG. 3. Referring to FIG. 4, the material selector controller 75 includes a processor 80, an interface 81 connected to the pallet detector 73, an interface 82 connected to the information transmission controller 76, an input/output buffer 83, a material tracking file 84, a requested material data file 85, a pallet monitoring timer 86, a material request monitoring timer 87, and an interface 88 connected to the machine tool subsystem 11.

Figure 5:
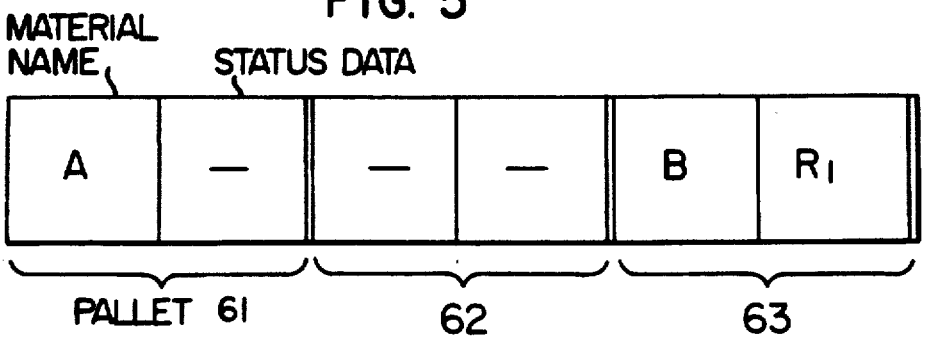
FIG. 5 shows data stored in one form of the material tracking file shown in FIG. 4.
Figure 6:
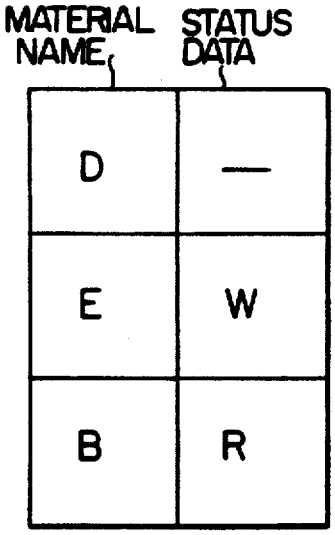
FIG. 6 shows data stored in one form of the requested material data file shown in FIG. 4.

FIGS. 5 and 6 show data stored in the material tracking file 84 and requested material data file 85 respectively, by way of example.

FIGS. 7 to 12 are flow charts illustrating by way of example, the steps of processing by the processor 80 shown in FIG. 4.

The operation of the material selector subsystem 31 shown in FIGS. 3 and 4 will now be described with reference to FIGS. 5 to 12.

Figure 7:
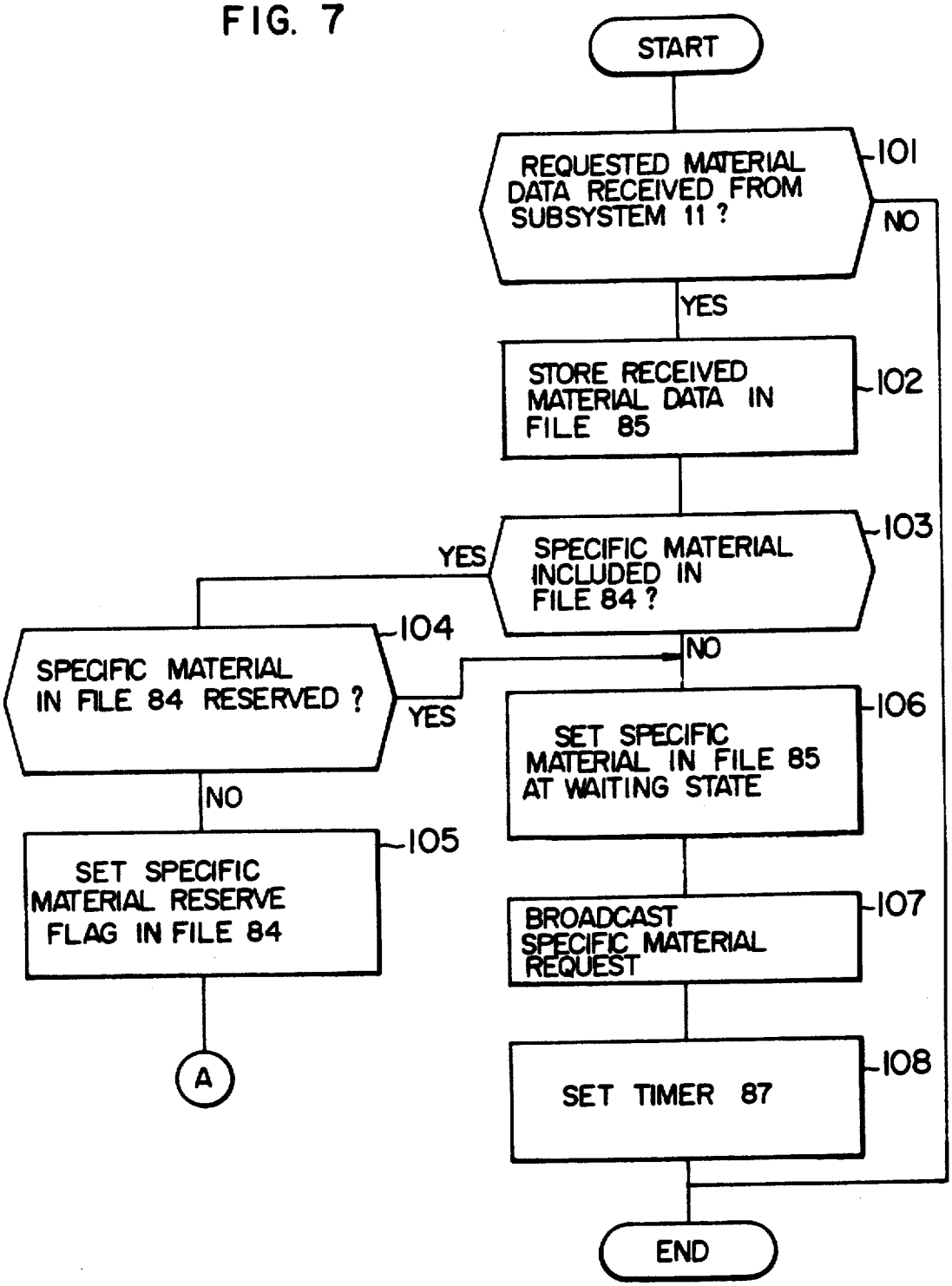
FIGS. 7 to 12 are flow charts illustrating the operation of the material selector subsystem shown in FIGS. 3 and 4.

The data of a material requested for a workpiece that can be processed now is broadcast from the machine tool subsystem 11 to the material selector controller 75 (block 101 in FIG. 7). The material selector controller 75 stores the data of requested material once in the input/output buffer 83. If the data in the buffer 83 is the data of requested material, the data is transferred into the requested material data file 85 (block 102 in FIG. 7).

On the other hand, when passage of a pallet is detected by the material detector 71 (block 109 in FIG. 8), the data of the material on the detected pallet is transmitted from the information transmission controller 76 to the downstream material selector subsystems by way of the information transmission loop 4. In the material selector controller 75 in each of the downstream material selector subsystems, the data of the material, transmitted thereto from the upstream material selector subsystem through the information transmission loop 4, information transmission controller 76 and interface 82, is stored once in the input/output buffer 83 and then stored in the material tracking file 84 (blocks 110 and 111 in FIG. 8). In this manner, data of materials are transmitted sequentially from the upstream material selector subsystem to be stored in the material tracking file 84 in each of the downstream material selector subsystems, and, at the same time, the data of the materials on the pallets departing toward the downstream material selector subsystems from the position of the material detector 72 in each of the material selector subsystems are erased from the material tracking file 84. Thus, in the downstream material selector subsystem next adjacent to the directly upstream material selector subsystem, the data of the materials on the pallets 61 to 63 are stored in the material tracking file 84 in a sequential order as shown in FIG. 5. FIG. 5 shows that each pallet data is composed of a material name data and a status data, and the status data designated by the symbol $R_1$ indicates that the material B is reserved for the material selector subsystem 31.

Figure 8:
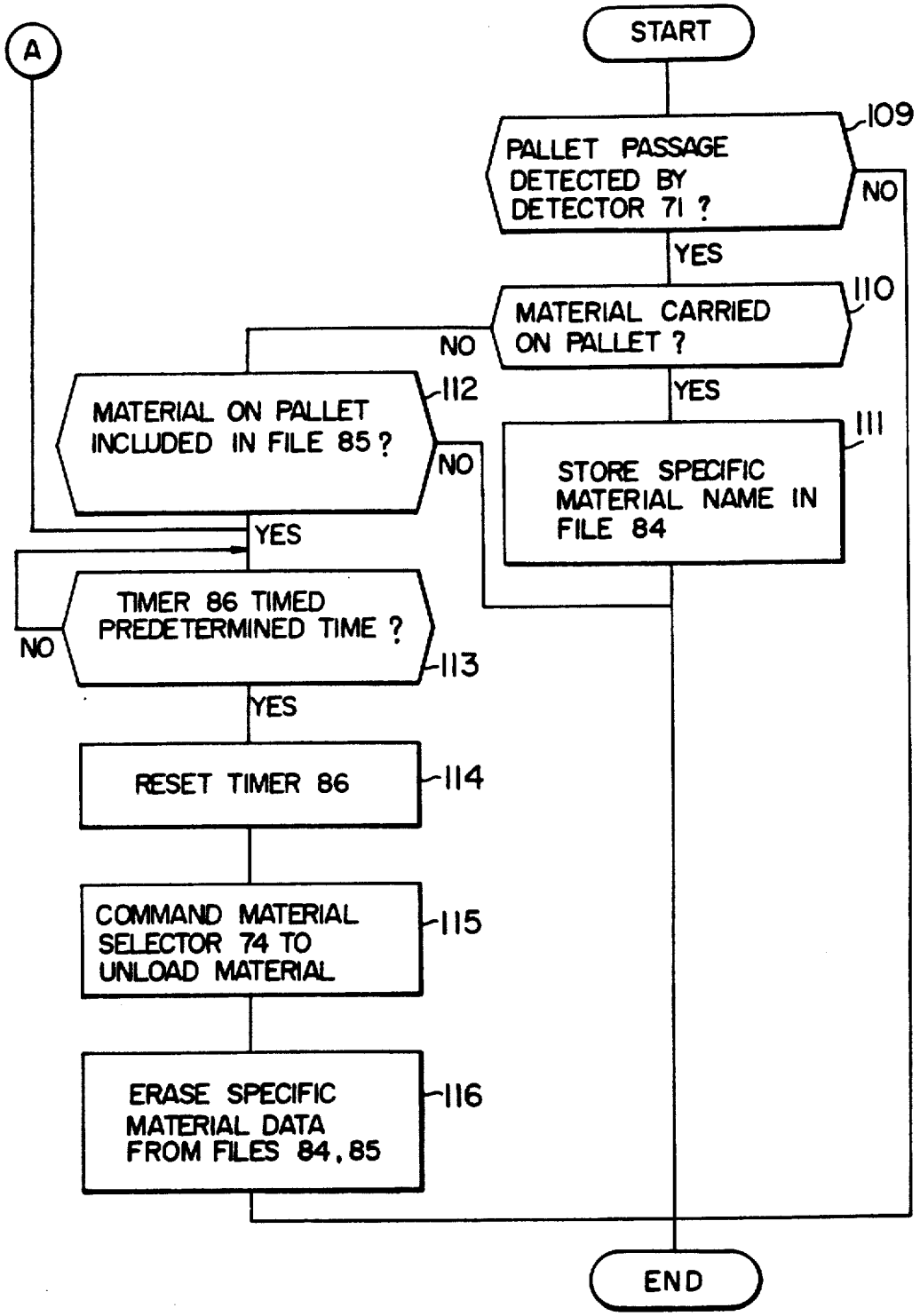

When the data of the requested material stored in the requested material data file 85 is also stored in the material tracking file 84 as shown in FIG. 5 (block 103 in FIG. 7) and when arrival of the pallet carrying the requested material is detected by the material detector 71 (block 109 in FIG. 8), and, then, when the material selector controller 75 is informed of the lapse of a predetermined period of time after detection of the pallet arrival, from the pallet monitoring timer 86 (block 113 in FIG. 8), the material selector controller 75 commands the material selector 74 to unload the specific material from the position of the pallet on the conveyor 2 (block 115 in FIG. 8). The above-mentioned predetermined period of time is selected such that the material selector 74 is ready for unloading the material from the pallet detected by the material detector 71 when the predetermined period of time has lapsed after the detection. The material selector 74 supplies the specific material to the machine tool subsystem 11. At the same time, the material selector controller 75 erases the data of the unloaded or removed material from both of the material tracking file 84 and the requested material data file 85 (block 116 in FIG. 8).

If the data of the material B stored in the requested material data file 85 is not found in the material tracking file 84, the status data of the material B in the requested material data file 85 is set at the "waiting" state W, and a flag indicative of the "Waiting" state W is then set (block 106 in FIG. 7). At the same time, a request for the material B is broadcast from the material selector controller 75 by way of the information transmission loop 4 (block 107 in FIG. 7), and the material request monitoring timer 87 is set (block 108 in FIG. 7).

Figure 9:
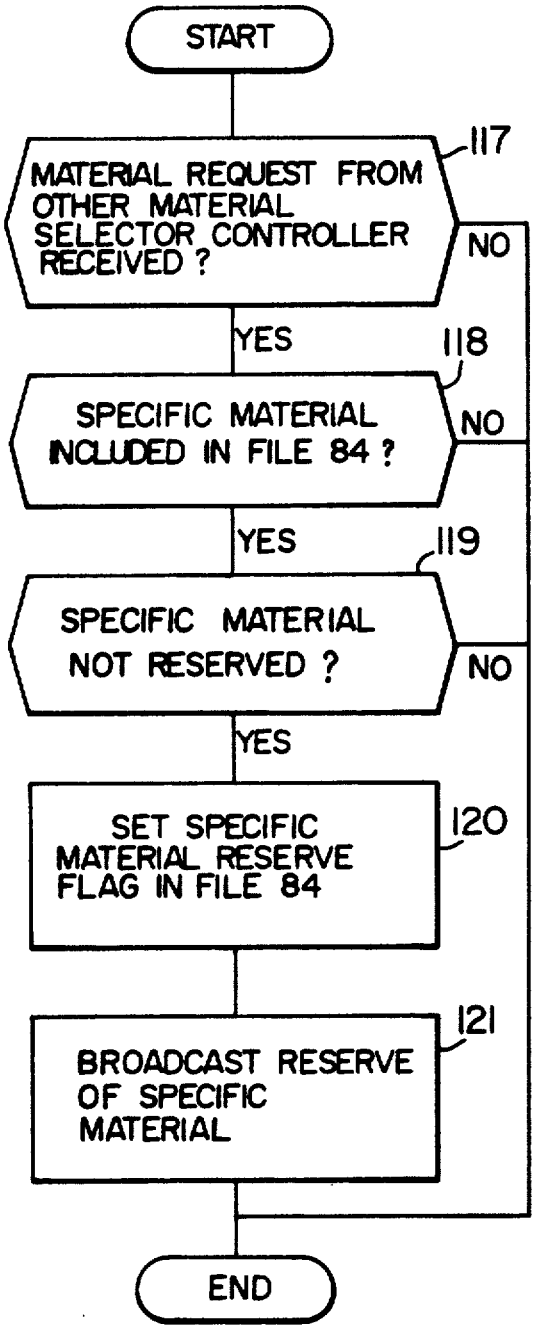
Figure 10:
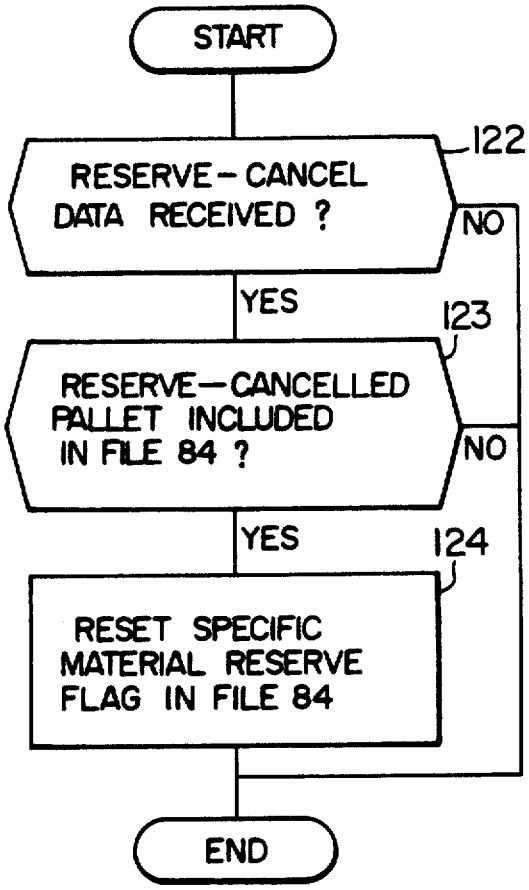

When each of the other material selector subsystems receives the request for the material B broadcast from the specific material selector controller 75 and transmitted by way of the information transmission loop 4 (block 117 in FIG. 9), it searches whether or not the specific material B is included in its material tracking file 85 (block 118 in FIG. 9), and a reservation flag $R_1$ indicative of reservation of the corresponding pallet 63 is set when the material B is included in its material tracking file 84 and is not still reserved (blocks 119 and 120 in FIG. 9). Then, the fact that the requested material B is now reserved is broadcast from the material selector controller 75 of that subsystem to the material selector controller 75 having broadcast the request for the material B (block 121 in FIG. 9). When the requested material B is found, the material selector controller 75 sets the reservation flag $R_1$ indicative of reservation of the requested material B in the requested material data file 85.

Figure 11:
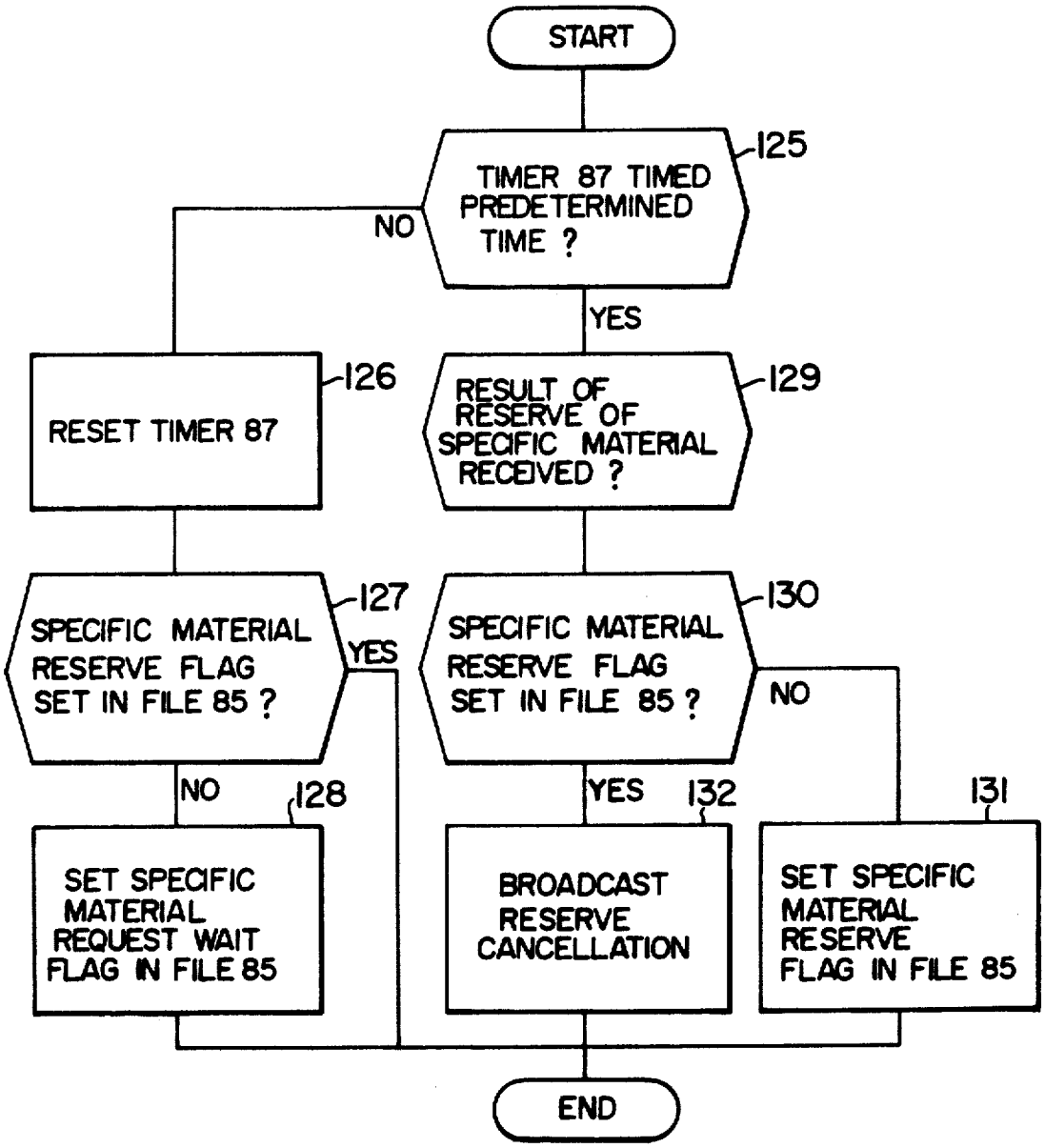

If two or more of the material selector subsystems answer booking of the reservation of the material B in response to the request for the material B, (blocks 129 and 130 in FIG. 11), the material selector controller 75 selects only one of the reserved pallets from among them and broadcasts cancellation of the reservation to the other pallets (block 132 in FIG. 11). When the reservation-cancelled pallet is included in the material tracking file 84 in each of the material selector controller 75 receiving the broadcast informing the cancellation of reservation, the material selector controller 75 resets the material reservation flag of the corresponding pallet (blocks 122, 123 and 124 in FIG. 10).

When the material selector controller 75 having broadcast the request for the material B does not receive the answer informing reservation of the request material B from any one of the other subsystems in spite of the fact that the material request monitoring timer 87 has timed a predetermined period of time, a request waiting flag W indicative of waiting a request for the material B is set in the requested material data file 85 (blocks 125, 126, 127 and 128 in FIG. 11). Thereafter, the material selector controller 75 broadcasts the request for the material of waiting state at predetermined constant time intervals. When the booking of reservation of the material B is answered, the request waiting flag W is reset, and the material reservation flag R is set (blocks 129, 130 and 131 in FIG. 11).

Figure 12:
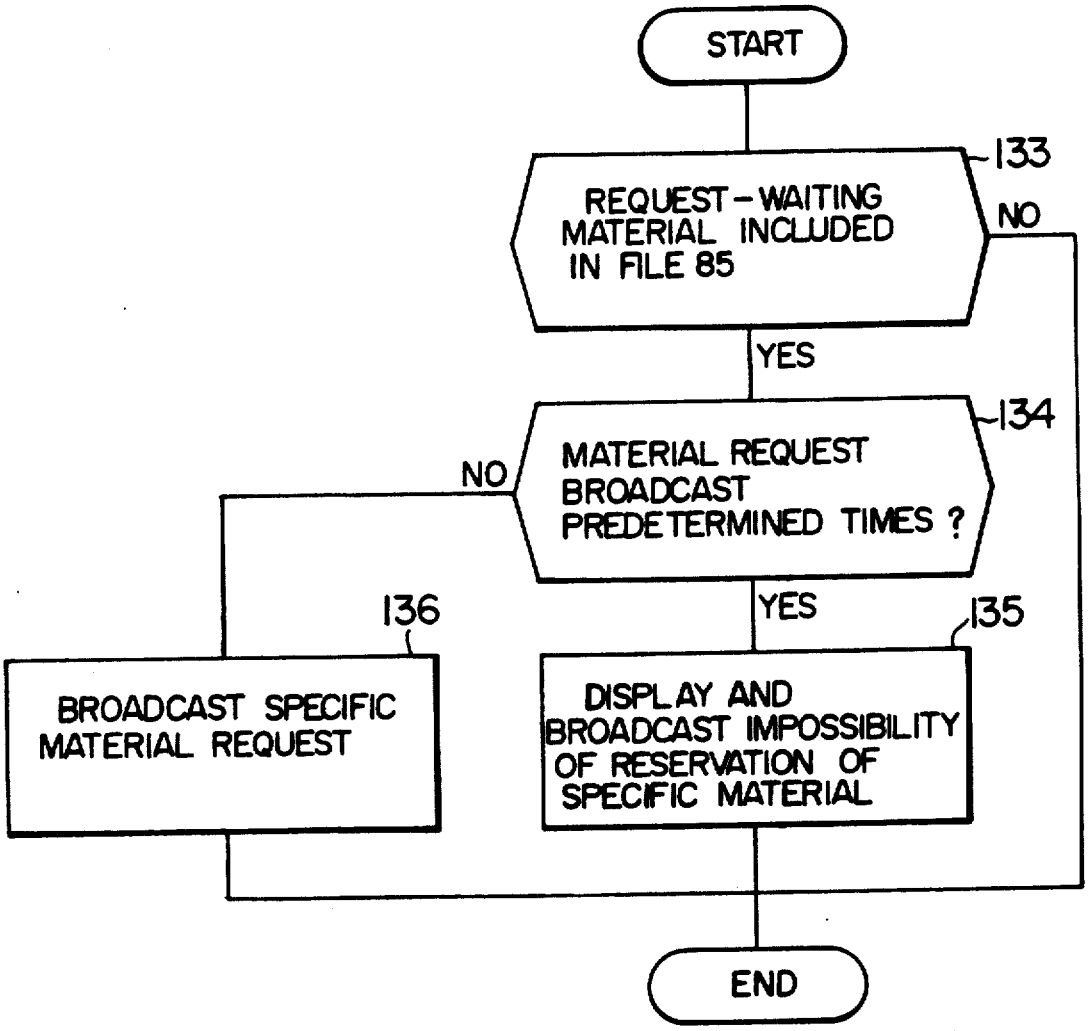

When the material B cannot be reserved although the material request has been broadcast more than a predetermined number of times (blocks 133 and 134 in FIG. 12), the material selector controller 75 of the subsystem 31 displays the impossibility of reservation, and, at the same time, broadcasts it to the other material selector controllers (block 135 in FIG. 12). Upon receiving this broadcast informing the impossibility of material reservation, the material selector subsystem 36 displays it too and calls for supply of the specific material to the system from the external source.

It will be understood from the foregoing detailed description of the present invention that distributed machine tools can select required materials to meet any machining demand, and the system can deal with operational failure and recovery of whichever machine tool at whatever time and can also deal with a system expansion, so that there is no need for previously arranging the material distribution schedule. Further, the present invention can save the useless length of time required hitherto for the transportation of materials to the machine tools whenever such materials are requested, and can also save the space required for storage of materials.

While the present invention has been described with reference to its application to a system including a plurality of distributed machine tools by way of example, it is apparent that the present invention is not in any way limited to application to such a specific system, and is applicable also to any one of assembling, working and other processing systems.

We claim:

1. A method for transporation of materials in a work-processing system including a plurality of work-processing means processing materials transported thereto by transporting means, comprising the steps of loading newly externally supplied materials on said transporting means detecting material transported by said transporting means by using a detector means associated with each of said work-processing means and storing the results of detection; issuing a material request from any work-processing means when the work-processing means requires a material which is not detected by said work-processing means; communicating the material request from the work-processing means which issued the material request to other processing means; causing each of said work-processing means to search a requested material indicated by the material request, based on the stored results of detection while keeping coordination with the other work-processing means in response to receipt of the material request; reserving said requested material for the work-processing means which issued the material request when said material is found on said transporting means as a result of the searching step while maintaining the material request when the searching step cannot find said requested material on said transporting means; and unloading said reserved material from said transporting means upon arrival of said material at the position of said work-processing means which issued the material request thereby supplying said material to said work-processing means.

2. An apparatus for transportation of materials in a work-processing system including a plurality of work-processing means processing materials transported thereto by transporting means, comprising load/unload commanding means for commanding loading of newly externally supplied materials on said transporting means and commanding unloading of said materials from said transporting means; transmission control means provided for each of said work-processing means for transmitting a material request issued from work-processing means associated therewith to other work-processing means and receiving a material request transmitted from the other work-processing means; and material selector means provided for each of said work-processing means and comprising means at each work-processing means for storing the material request issued from the work processing associated therewith and the material requests transmitted from the other work-processing means; means at each work-processing means for detecting materials on said transporting means and storing the results of detection, means for searching a requested material based on the contents of said material request storing means and said means for storing the results of detection while keeping coordination among said work-processing means, means for reserving the requested material when it is found by said searching means that the requested material on said transporting means and reporting a reservation of requested material to other work-processing means, and means for continuously issuing a material request when said workprocessing means cannot find the requested material on said transporting means.

3. An apparatus according to claim 2, wherein each of said work-processing means comprises a first subsystem for carrying out a work process and a second subsystem including said material selector means and said transmission control means, said transmission control means being connected through a transmission path to the transmission control means of the other work-processing means.

4. An apparatus according to claim 3, wherein each of said work-processing means further comprises means for reporting to the load/unload commanding means that requested material is not reserved after repeated issuance of a material request a predetermined number of times, so as to cause said load/unload commanding means to supply the requested material.

*5. A method for processing materials in a processing system including a plurality of subsystems which process at least one selected material and operate independently of each other, a means for relatively moving materials with respect to said subsystems and a transmission medium connected with said subsystems for transmitting information relating to the materials to said subsystems, comprising the following steps executed by each of said subsystems:*

*transmitting information relating to the materials moved by said moving means to said transmission medium;*

*receiving information relating to the materials moved by said moving means and transmitted from other subsystems through said transmission medium;*

*selecting at least one necessary material from among the materials moved by said moving means based on the received information relating to the materials from said transmission medium; and*

*processing said selected material upon arrival said selected material.*

*6. A method for processing materials according to claim 5, which further includes a step of reserving said necessary material when it is selected by said selecting step so as to process said selected material upon arrival of said reserved material.*

*7. A method for processing materials according to claim 5, wherein said moving means comprises a means for transporting said materials, and a means for loading said materials on said transporting means.*

*8. A method for processing materials according to claim 5, wherein said information on the materials comprises information showing the presence of a material which has been moved by said moving means.*

*9. An apparatus for processing materials, comprising;*

*a plurality of first subsystems each of which processes at least one selected material;*

*means for relatively moving the materials with respect to said subsystems;*

*a plurality of second subsystems associated with said first subsystems, respectively, and connected to a transmission medium, each of said second subsystems configured to operate independently of each other based on information on said transmission medium and including means for transmitting information relating to the materials moved by said moving means to said transmission medium; and*

*means for selecting at least one necessary material from among the materials moved by said moving means based on the information relating to the materials transmitted from other subsystems and received from said transmission medium, and each of said first subsystems including means responsive to selection of at least one necessary material by the associated second subsystem for processing said selected material upon arrival thereof.*

*10. An apparatus for processing materials according to claim 9, further including means for reserving said necessary material when it is selected by said selecting means so as to process said selected material upon arrival of said reserved material.*

*11. An apparatus for processing materials according to claim 9, wherein said moving means comprises means for transporting said materials.*

*12. An apparatus for processing materials according to claim 9, wherein said information on the materials comprises information showing the presence of a material which has been moved by said moving means.*

*13. A method for transportation of materials in a processing system including a plurality of processing means processing materials transported thereto by transporting means, comprising the steps of: loading materials on said transporting means; issuing a material request from any processing means when the processing means requires a material; communicating the material request from the processing means which issued the material request to other processing means; detecting materials transported by said transporting means by using a detector means associated with at least one of said processing means and storing the results of detection; causing each of said processing means to search a requested material indicated by the material request, based on the stored results of detection; reserving said requested material for the processing means which issued the material request when said material is found on said transporting means as a result of the searching step; and unloading said reserved material from said transporting means upon arrival of said material at the position of said processing means which issued the material request thereby supplying said material to said processing means.*

*14. An apparatus for transportation of materials in a processing system including a plurality of processing means processing materials transported thereto by transporting means, comprising load/unload commanding means for commanding loading of materials on said transporting means and commanding unloading of said materials from said transporting means; transmission control means provided for each of said work-processing means for transmitting a material request issued from processing means associated therewith to other processing means and receiving a material request transmitted from the other processing means; and material selector means provided for each of said processing means and comprising means for storing the material request issued from the processing means associated therewith and the material requests transmitted from the other processing means; means for detecting materials on said transporting means and storing the results of detection; means for searching a requested material based on the contents of said material request storing means and said means for storing the results of detection; and means for reserving the requested material when it is found by said searching means that the requested material on said transporting means and reporting a reservation of requested material to other processing means.*

*15. An apparatus according to claim 14, wherein each of said processing means comprises a first subsystem for carrying out a material process and a second subsystem including said material selection means and said transmission control means, said transmission control means being connected through a transmission path to the transmission control means of the other processing means.*

*16. An apparatus according to claim 15, wherein each of said processing means further comprises means for reporting to the load/unload commanding means that requested material is not reserved after repeated issuance of a material request a predetermined number of times, so as to cause said load/unload commanding means to supply the requested material.*

*17. A method for controlling machine tools in a distributed system having a plurality of subsystems, each of which has a machine tool and controller for operating an associated machine tool and a transmission medium connected with said subsystems for transmitting information to said subsystems, comprising the following steps executed by each of said subsystems;*

*transmitting the information to said transmission medium;*

*receiving information transmitted from other subsystems through said transmission medium;*

*independently determining whether or not the machine tool is operated based on the received information from said transmission medium; and*

*operating said machine tool based on the independently determined result.*

*18. A method for controlling machine tools in a distributed system having a plurality of subsystems, each of which has a machine tool for processing at least one material and a controller for operating the machine tool, a means for relatively moving materials with respect to said subsystems*

*and a transmission medium connected with said subsystems for transmitting information relating to the materials to said subsystems, comprising the following steps executed by each of said subsystems:*

*transmitting information relating to the materials moved by said moving means to said transmission medium;*

*receiving information relating to the materials moved by said moving means and transmitted from other subsystems through said transmission medium;*

*independently determining whether or not the machine tool is operated for processing the material moved by said moving means based on the received information relating to the materials from said transmission medium; and*

*operating the machine tool based on the independently determined result.*

*19. A material selector subsystem, comprising:*

*means for detecting a pallet on a conveyor;*

*a pallet detector for receiving signals from the detecting means;*

*a material selector for selectively unloading materials from the conveyor;*

*a material selector controller operatively associated with the material selector, including a processor, an interface operatively associated with the pallet detector, an interface operatively associated with the information transmission controller, a material tracking file operatively associated with the processor, a requested material data file operatively associated with the processor, a pallet monitoring timer operatively associated with the processor, a material request monitoring timer operatively associated with the processor, and an interface for connecting the subsystem with a materials processor for processing a selected one of the materials on the conveyor; and*

*an information transmission controller for exchange of information with at least one other material selector subsystem.*

*20. The subsystem according to claim 19, wherein the material selector controller further comprises an input-/output buffer operatively associated with the processor for storing data of requested material and transferring said data to the requested material data file.*

*21. The subsystem according to claim 19, wherein the material tracking file stores data comprising material name data and a status data indicating whether a material has been reserved for another material selector subsystem.*

*22. The subsystem according to claim 19, wherein the requested material data file comprises material name data and a status data to be found in the material tracking file to broadcast from the material selector controller via an information transmission log for reserving still unreserved materials.*

*23. A method for manufacturing a product in a distributed system including a plurality of subsystems for transmitting information between said subsystems, said method comprising the following steps executed by each of said subsystems:*

*transmitting the information to said transmitting medium;*

*receiving the information transmitted from other subsystems through said transmission medium;*

*independently selecting operation to be performed by its own subsystem based on the received information from said transmission medium; and*

*executing the selected operation based on the result of the selecting step.*

* * * * *